United States Patent
Cosentino et al.

(10) Patent No.: US 11,995,096 B2
(45) Date of Patent: May 28, 2024

(54) CREATION OF MESSAGE SERIALIZER FOR EVENT STREAMING PLATFORM

(71) Applicant: Red Hat, Inc., Raleigh, NC (US)

(72) Inventors: Andrea Cosentino, Rome (IT); Paolo Antinori, Novara (IT)

(73) Assignee: Red Hat, Inc., Raleigh, NC (US)

( * ) Notice: Subject to any disclaimer, the term of this patent is extended or adjusted under 35 U.S.C. 154(b) by 366 days.

(21) Appl. No.: 17/411,738

(22) Filed: Aug. 25, 2021

(65) Prior Publication Data

US 2023/0060957 A1 Mar. 2, 2023

(51) Int. Cl.
| | |
|---|---|
| G06F 16/25 | (2019.01) |
| G06F 8/35 | (2018.01) |
| G06F 9/30 | (2018.01) |
| G06F 9/38 | (2018.01) |
| G06F 9/455 | (2018.01) |
| G06F 16/21 | (2019.01) |
| G06F 16/28 | (2019.01) |
| H04L 65/60 | (2022.01) |

(52) U.S. Cl.
CPC ............. *G06F 16/252* (2019.01); *G06F 8/35* (2013.01); *G06F 9/30087* (2013.01); *G06F 9/3812* (2013.01); *G06F 9/45508* (2013.01); *G06F 16/211* (2019.01); *G06F 16/289* (2019.01); *H04L 65/60* (2013.01)

(58) Field of Classification Search
CPC .... G06F 16/289; G06F 16/211; G06F 16/901; G06F 16/221; G06F 9/542; G06F 9/44521; G06F 9/44505; G06F 8/315; G06F 9/44526
USPC ................ 707/682, 674, 718, 713, 856, 736
See application file for complete search history.

(56) References Cited

U.S. PATENT DOCUMENTS

| | | | | |
|---|---|---|---|---|
| 9,298,788 | B1* | 3/2016 | Kekre | G06F 16/258 |
| 10,592,386 | B2* | 3/2020 | Walters | G06F 21/552 |
| 10,620,924 | B2* | 4/2020 | Stojanovic | G06F 16/2322 |
| 10,789,254 | B2* | 9/2020 | Chandramouli | G06F 16/2457 |
| 11,599,526 | B2* | 3/2023 | Thummala Abbigari | |
| | | | | G06F 16/2379 |
| 2011/0264727 | A1* | 10/2011 | Keum | H04L 65/80 |
| | | | | 709/217 |
| 2017/0116210 | A1* | 4/2017 | Park | G06F 16/2433 |
| 2018/0075163 | A1* | 3/2018 | Park | G06F 16/24568 |

(Continued)

FOREIGN PATENT DOCUMENTS

CN 106649766 12/2020

OTHER PUBLICATIONS

"Kafka 2.0 Documentation," <https://kafka.apache.org/20/documentation.html>.

(Continued)

*Primary Examiner* — Shahid A Alam
(74) *Attorney, Agent, or Firm* — Womble Bond Dickinson (US) LLP

(57) ABSTRACT

Processing logic may determine that an application is to produce one or more records to an event streaming platform. Processing logic may determine a data structure to contain content to be stored to the event streaming platform. Processing logic may automatically generate a serializer in view of the data structure during development of the application. During runtime, the application may use the serializer to serialize the content contained in the data structure and store the content to the one or more records of the event streaming platform.

20 Claims, 5 Drawing Sheets

(56) References Cited

U.S. PATENT DOCUMENTS

| | | | |
|---|---|---|---|
| 2020/0241942 A1* | 7/2020 | Crouse | G06F 9/544 |
| 2021/0133632 A1* | 5/2021 | Elprin | G06N 20/10 |
| 2022/0114483 A1* | 4/2022 | Sabharwal | G06F 16/9536 |
| 2022/0374398 A1* | 11/2022 | Cosentino | G06F 9/542 |

OTHER PUBLICATIONS

Sayag, Moshe, "Kafka, Streams and Avro serialization," <https://msayag.github.io/Kafka/>, Nov. 25, 2017.

Beni, Andras, "Robust Message Serialization in Apache Kafka Using Apache Avro, Part 1," <https://blog/cloudera.com/robust-message-serialization-in-apache-kafka-using-apache-avro-part-1/>, Jul. 19, 2018.

"Spring Cloud Stream Kafka Binder Reference Guide," <https://docs.spring.io/spring-cloud-stream-binder-kafka/docs/3.1.0.M1/reference/html/index.html>.

Russell, Gary, et al., "Spring for Apache Kafka," Pivotal Software Inc., <http://devdoc.net/javaweb/spring/spring-kafka-docs-2.2.3/reference/htmlsingle/>, 2016, 2018.

"Validating Schemas Using Kafka Client Serializers/Deserializers in Java," <https://www.apicur.io/registry/docs/apicurio-registry/2.0.0.Final/getting-started/assembly-using-kafka-client-serdes.html>, 2020.

\* cited by examiner

CREATION OF MESSAGE SERIALIZER FOR EVENT STREAMING PLATFORM

TECHNICAL FIELD

Aspects of the present disclosure relate to event streaming systems, and more particularly, to creation of a serializer that serializes content in event streaming system.

BACKGROUND

Event streaming platforms and systems thereof may support real-time processing of continuous streams of data. When an event occurs, a record may be stored. Events may differ from one application to another. For example, an event may occur when a player scores in a basketball game, when a trade is made on a public stock exchange, when a car enters or exits a parking lot, or when something else of interest occurs.

Event streaming technology may be available in a variety of formats such as distributed publish-subscribe messaging systems (e.g., the Apache Kafka™ system), distributed real-time computation systems (e.g., the Apache Storm™ system), and streaming data flow engines (e.g., the Apache Flink™ system). Event streaming systems may be implemented in a variety of architectures including a microservices architecture (e.g., the Red Hat™ OpenShift™ platform).

BRIEF DESCRIPTION OF THE DRAWINGS

The described embodiments and the advantages thereof may best be understood by reference to the following description taken in conjunction with the accompanying drawings. These drawings in no way limit any changes inform and detail that may be made to the described embodiments by one skilled in the art without departing from the spirit and scope of the described embodiments.

DETAILED DESCRIPTION

Figure 1:
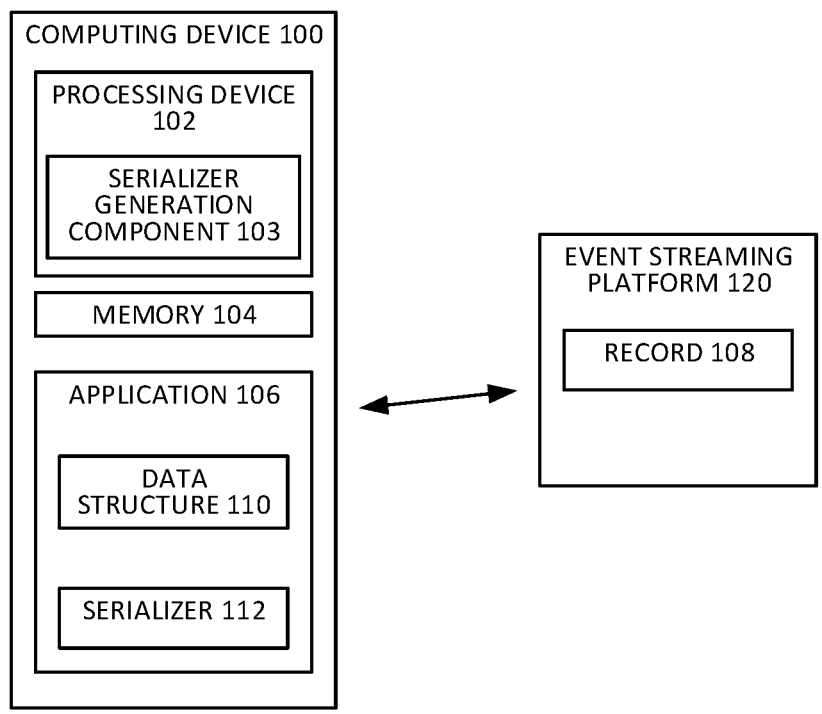
FIG. 1 shows a block diagram of a computing device that generates a serialize for an event streaming environment, in accordance with some embodiments.

An application may generate content in response to an occurrence of an event such as, for example, a score in a basketball game, a financial transaction, or other event deemed to be of interest. The application may store the content to an event streaming platform such as, for example, Apache Kafka™. For each event, the application may store the content as a record to the event streaming platform. The platform may have a dedicated record container such as, for example, a Kafka Topic™, for different categories of events. An application that appends records to an event streaming platform may be referred to as a producer. An application that consumes records from the record container may be referred to as a consumer.

During runtime, when an event occurs that is detected by the producer, the producer may generate content to be stored at the event streaming platform. Content may be stored at the event streaming platform in a serialized format. Therefore, to store the content as a record at the event streaming platform, the producer may first serialize the content. The result of the serialization is a byte stream of the content, which the producer sends to the event streaming platform for storage. Similarly, a consumer obtains the content from the event streaming platform in the form of a byte stream. The consumer deserializes the content, and stores it into a data structure, so that the content may be readily accessible within the consumer application.

In conventional systems, a developer may manually write the code for an application, including writing code for a serializer and/or deserializer class. These classes are written by the developer to serialize content into a byte stream (fora producer) and to deserialize content from a byte stream (for a consumer). The classes may be written in view of the underlying data structure of the content that is being sent or received by the application. Given that the structure of a record may be unique from one application to another, a developer may manually write a unique serializer and/or deserializer for each producer and/or consumer application. Further, the underlying data structure of a record may vary from a primitive type to a complex type such as, for example, a plain old Java object (POJO). For example, one data structure may have tens of fields, which may also be understood as properties. Another data structure may have a single string or number. Generating a serializer or deserializer class for a complex type may be challenging and time consuming due to the various data types, the order of the fields, and lengths of each field. The developer may manually generate a reference that points to the manually generated serializer and/or deserializer classes in configuration settings of the application. The application may use the pointers to the classes to execute the classes on records during runtime of the application. As such, the conventional method of manual creation and configuration management of such serializer and deserializer classes by a developer may be tedious and error prone.

Further, automatic generation of a serializer and/or deserializer for an application may present difficulties. Determining when to automatically generate a serializer or deserializer may be difficult given that not all applications are producers or consumers that are to operate in an event streaming platform. Further, generating the serializer and/or deserializer class entails determining a format for the byte stream that into be written, which may not be readily available.

Aspects of the disclosure address the above-noted and other deficiencies by automatically generating code, such as a serializer and/or deserializer class, that is used during runtime to serialize and/or deserialize content in an event streaming platform environment. This may be performed by processing logic during development of a client application, prior to compiling of the source code. As such, processing logic may improve developer efficiency, reduce error, and allow the developer to direct focus towards application specific functionality. Such features, which may be described as tooling technology, may be initiated by an executable file or a plugin (e.g., a Maven plugin), which may be triggered automatically or based on user input. The functionality, which may be performed by processing logic, may be embedded in an integrated development environment (IDE) or be presented as a standalone application.

In one example, processing logic may determine that an application is a producer of one or more records to an event streaming platform. Processing logic may determine a data structure to contain content to be stored to the one or more records. The data structure may include which fields are contained in the data structure, the data types of each field, a sequence of the fields, and/or length of each field. The format of the data structure may conform with a format of the one or more records. The processing logic may generate a serializer for the application in view of the data structure. The serializer may include coded operations that serialize each field of the data structure in the particular sequence as defined by the data structure. The serializer may be generated prior to compiling of the application, e.g., during development.

During development, the application may include source code, settings, configuration data, and other supporting features that may be organized collectively as an application project. The source code of the application may be compiled to produce a machine-executable version of the application. During runtime, processing logic may instantiate an instance object from the serializer class, use the serializer to serialize content in the data structure, and store the serialized content to a record on an event streaming platform.

FIG. 1 is a block diagram illustrating a computing device 100 that generates a serializer 112 for an event streaming environment, in accordance with some embodiments.

Computing device 100 includes a processing device 102 and a memory 104. Memory 104 may include volatile memory devices (e.g., random access memory (RAM)), non-volatile memory devices (e.g., flash memory) and/or other types of memory devices.

Processing device 102 includes a serializer generation component 103. Serializer generation component 103 may determine that an application 106 is a producer of one or more records 108 of an event streaming platform 120. Application 106 may be a pre-compiled version of the application that includes source code, libraries, settings, configuration data, and other supporting features that may be organized collectively as an application project.

The serializer generation component 103 may determine a data structure 110 that is to contain content to be stored to the one or more records 108. The data structure 110 may have a format that conforms with a format of the one or more records 108. For example, each of the one or more records 108 may have a 'Name' field, an 'Address' field, and an 'Age' field. The data structure may have a first field with 'Name', a second field with 'Address', and a third field with 'Age'. These fields may be understood as fields or properties of the data structure. In one example, the data structure may be a class such as a plain old java object (POJO).

The serializer generation component 103 may, during development of the application, generate a serializer 112 for the application based on the data structure 110. The serializer 112 may be used by the application 106 to serialize the content contained in the data structure 110 during runtime of the application 106.

For example, serializer 112 may be generated by the processing device 102 as a serializer class during development of the application. During runtime, the processing device 102 may instantiate an instance object of the serializer class. When an event occurs, processing device 102 may pack content into data structure 110 and use the serializer 112 to serialize the data structure 110, resulting in a byte stream. Processing device 102 may store the byte stream as a record 108 on the event streaming platform 120.

Figure 2:
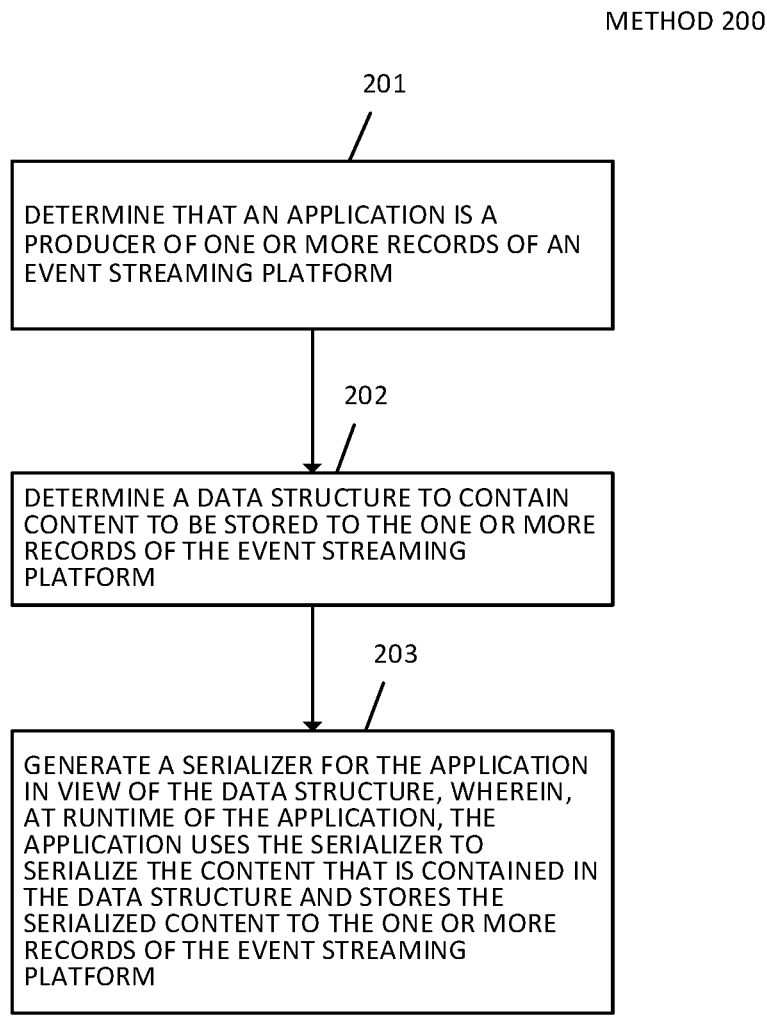
FIG. 2 shows an example method for generating a serializer for an event streaming environment, in accordance with some embodiments.

FIG. 2 shows an example method 200 for generating a serializer for an event streaming environment, in accordance with some embodiments. The method may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof.

With reference to FIG. 2, method 200 illustrates example functions used by various embodiments. Although specific function blocks ("blocks") are disclosed in method 200, such blocks are examples. That is, embodiments are well suited to performing various other blocks or variations of the blocks recited in method 200. It is appreciated that the blocks in method 200 may be performed in an order different than presented, and that not all of the blocks in method 200 may be performed.

At block 201, processing logic may determine that an application is a producer of one or more records to an event streaming platform. For example, processing logic may search the pre-compiled application, which may be organized as a project that includes software instructions and other features. Processing logic may search the project and the code to determine whether, during runtime, the application sends content to an event streaming platform to be stored as a record.

In some examples, processing logic may search the application to detect the presence of a class, a interface, a library, or input parameters that are associated with the event streaming platform.

Regarding searching by class or interface, processing logic may search classes and/or interfaces of the application to detect whether one or more known event streaming packages (e.g., a Kafka package) are imported. For example, processing logic may search the classes and/or interfaces to determine whether a Kafka 'Producer' class or package is implemented, and/or whether the code contains a reference to a 'Record' class.

Processing logic may detect the presence of a specific library by analyzing project dependencies, such as a Project Object Model (POM) file, 'build.gradle' file or 'ant' file, to determine if the project relates to an event streaming platform (e.g., Apache Kafka). The dependencies portion of the file may be parsed to detect presence of 'Kafka-client', 'kafka_2.1', or other artifacts relating to Apache Kafka or another event streaming platform.

Regarding searching specific input parameters, processing logic may search the properties of the project to detect presence of specific key names in the properties. For example, properties may be stored in a configuration or property file associated with the project (e.g., an 'application.properties' file). Processing logic may search the properties to detect presence of event streaming related properties like key.converter, value.converter, value.serializers, etc. Processing logic may obtain an event streaming configuration master list and compare this with the properties to see if the properties of the project are configured to be directed towards event streaming (e.g., as a consumer or producer).

In some aspects, if processing logic detects the presence of a specific class, a specific interface, a specific library, or specific input parameters that are associated with the event streaming platform, then processing logic may deem that the application is a producer application that produces a record to an event streaming platform. In response to determining that the application is a producer, processing logic may proceed to block 202. Otherwise, processing logic may exit the method. As such, processing logic may perform blocks 202 and 203 in response to determining that the application is a producer application for an event streaming platform.

At block 202, processing logic may determine a data structure to contain content to be stored to the one or more records of the event streaming platform. For example, processing logic may search the application to detect presence of a send method that is used by the application to store content as a record on an event streaming platform. Processing logic may search the application code for an explicit application programming interface (API) invocation such as send (ProducerRecord<Key,Value>record). In some aspects, detecting presence of a send method may also be used at block 201 to determine whether or not the application is a producer of a record.

In some examples, processing logic may extract the arguments of the send method (e.g., the Value type) and infer the data type of the record based on the arguments. An argument of the send method may be taken as the data type. For example, if the argument is a complex data type named 'contentContainer', processing logic may search the application code to determine the structure of 'contentContainer' such as which fields are present and in what order. The argument of the send method may also indicate whether the data type is a primitive or complex type. A primitive type may include, for example, a byte, short, int, long, float, double, char, Boolean, or a string. A complex type may include, for example, a class that contains one or more primitive types, and/or other complex types. A complex type may be a plain old java object (POJO).

At block 203, processing logic may generate a serializer for the application in view of the data structure, wherein, at runtime of the application, the application uses the serializer to serialize the content that is contained in the data structure and stores the serialized content to the one or more records of the event streaming platform. In some examples, if the data structure is a primitive type, then processing logic may import an existing primitive-type serializer that corresponds to the primitive type of the data structure. For example, if an argument of the send method indicates that the data structure is a primitive type such as a String, then processing logic may import an existing primitive type serializer that corresponds to the primitive type of the data structure such as, for example, StringSerializer. Existing serializers for primitive types may be obtained from the event streaming platform such as Apache Kafka™.

If the data structure is a complex type, then processing logic may search the application to determine a structure of the complex type, such as with the 'contentContainer' example described above. The structure of the complex type may include the data types (which may be fields or properties) that are contained in the complex type, their lengths, and/or the order in which they are arranged. In view of the structure of the complex type, processing logic may apply an existing tool or library to the complex type to generate a serializer for the complex type. For example, processing logic may call an existing tool such as JavaPoet™ which provides API for generation of source code with automated import of dependent classes. Processing logic may also call upon other libraries and/or tools to generate the serializer for complex types. The serializer may be created as a class with one or more functions that, during runtime, converts the data structure to a byte stream.

The data type, whether it be complex or primitive type, may have a structure that conforms to the structure of the record that the application is writing to or reading from. For example, if the record includes only a 'Name' field, then the underlying data type may be a String or a set of chars representing 'Name'. If the record includes 'Name', 'Address', 'Age', then the underlying data type may be a complex type with 'Name', 'Address', and 'Age'.

In some examples, an application may be a producer and consumer. Processing logic may further generate a deserializer for the application in view of the data structure of the record. During runtime, the application may use the deserializer to read a record off of the event streaming platform. In some examples, processing logic may determine that the application is a consumer of a record by searching the application code for a call to a poll function that consumes the one or more records.

When processing logic uses a tool or library to generate the serializer, the tool or library may write a class (e.g., a Java class) that implements a Serializer interface. When processing logic uses a tool or library to generate the deserializer, the tool or library may write a class that implements the Deserializer interface. Processing logic may customize generation of serializers/deserializers. For example, processing logic may specify that usage of JSON be set.

Processing logic may set a package where the serializer is generated and stored. Processing logic may set the package to a default position or directory, such as, for example, 'org.project.kafka.sample.serializers' and 'org.project.kafka.sample.deserializers'.

In some embodiments, processing logic may generate a reference within the application to the serializer and/or deserializer. For example, processing logic may place a pointer to the serializer and/or deserializer in a configuration file or setting of the project of the application. During runtime, processing logic may execute the application and use this pointer to obtain the serializer and/or deserializer.

Processing logic may perform method 200 prior to compilation of the application. The application may be understood as a pre-compiled version of the application. This application may include one or more files that have source code. Source code may include a plurality of software instructions that may be compiled by a compiler to form an executable version of the application. A developer may write the source code using a simple word processing tool or a more sophisticated tool such as an IDE. In some examples, the source code is organized as a project that may include one or more classes or interfaces that serve as blueprints for objects that are instantiated during runtime of the application. An interface may be an abstract type that is used to specify a behavior that a class is to implement. The source code may utilize one or more libraries that have additional source code and functionality that may be referenced and called upon by the source code.

Figure 3:
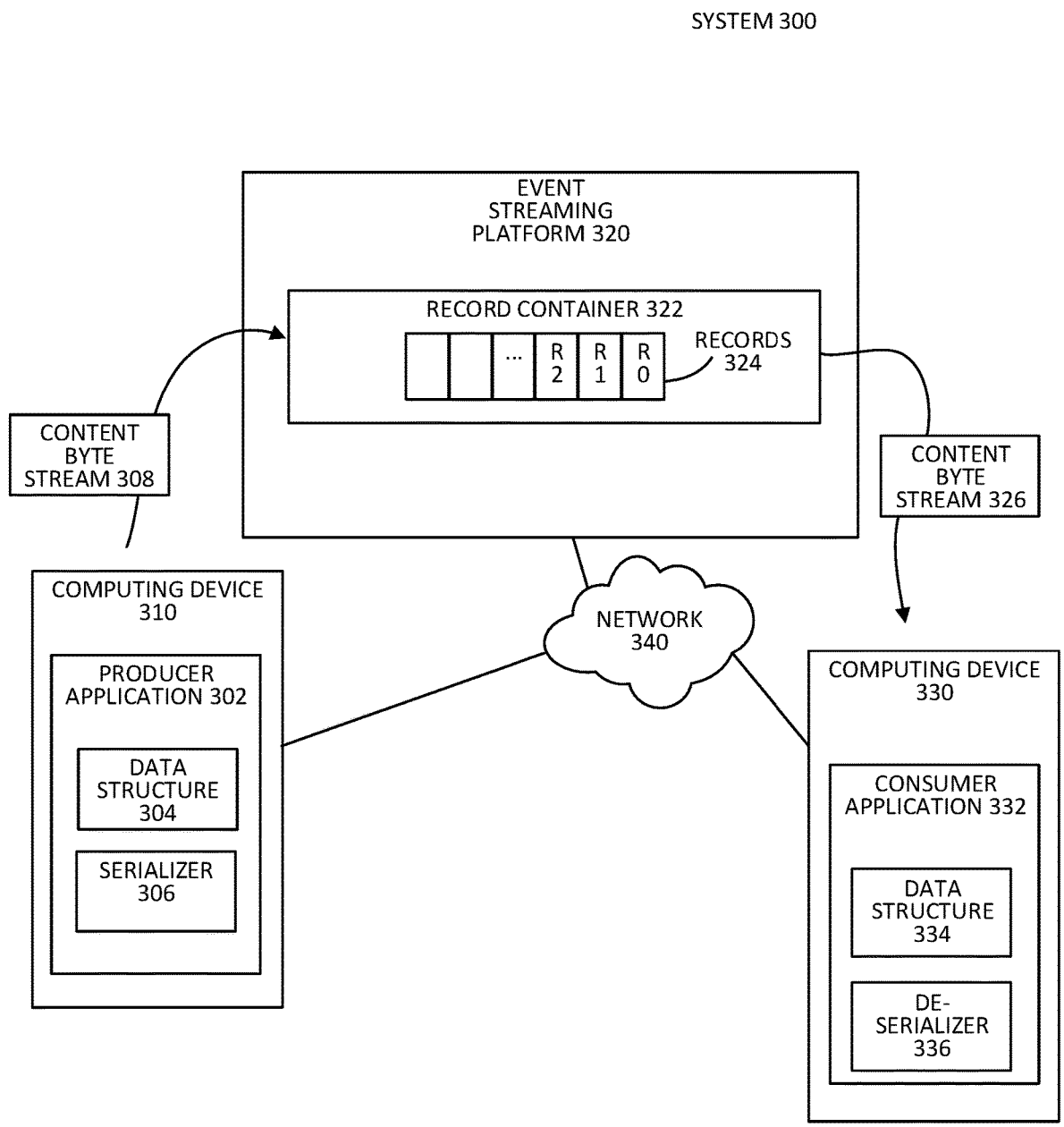
FIG. 3 shows an example event streaming system, in accordance with some embodiments.

FIG. 3 shows an example event streaming system, in accordance with some embodiments. As illustrated, the system 300 includes a computing device 310, an event streaming platform 320, and a computing device 330. It should be understood that the event streaming platform 320 may be hosted on one or more computing devices. Further, computing devices 310 and 330 may, in some embodiments, each be a plurality of computing devices. Applications such as the producer application 302, the event streaming platform 320, and/or consumer application 332 may be distributed across multiple computing devices with a distributed system architecture.

The computing devices 310, 330, and the event streaming platform 320 may be communicatively coupled over a network 340. Network 340 may be a public network (e.g., the internet), a private network (e.g., a local area network (LAN) or wide area network (WAN)), or a combination thereof. Network 340 may include a wired or a wireless infrastructure, which may be provided by one or more wireless communications systems, such as a WiFi™ hotspot connected with the network 340 and/or a wireless carrier system that may be implemented using various data processing equipment, communication towers (e.g. cell towers), etc. The network 340 may carry communications (e.g., data, message, packets, frames, etc.) between computing device 310, 330, and/or event streaming platform 320.

An event streaming platform 320 may have a record container 322. The record container 322 may store one or more records 324. In some examples, an event streaming platform may be an Apache Kafka™ event streaming platform. The record container 322 may be a Kafka Topic™.

The record container 322 may be a Kafka Topic™. In a Kafka Topic™, each record 324 may include a key-value pair. Either the record key or the record value, or both, may be serialized. Formats for serialization may include, for example, Avro, JSON, or Protobuf. The record container 322 may be treated as a category or feed name to which records are stored and published. An event streaming platform may have multiple record containers, each storing records relating to a particular category. For example, each record container may house records for a particular soccer match.

The producer application 302 may monitor the occurrence of one or more events such as, for example, a financial transaction, a score in a basketball game, a vehicle entering or exiting a parking lot, or other event. When an event occurs, the producer application 302 may generate content and populate the content to a data structure 304. When the application sends the content in the data structure 304 to the event streaming platform to be stored as a record 324, the serializer 306 converts the content in the data structure to a content byte stream 308. This content byte stream 308 is then stored to a record 324 in the form of the byte stream.

The consumer application 332 may consume the one or more records 324 from the event streaming platform 320. As discussed, each record may contain content in the form of a byte stream, which may be understood as a serial stream of bytes. To consume a record 324, the consumer application may use a deserializer 336 to unpack the content byte stream 326 into a data structure 334.

The consumer application 332 may consume a record in order (e.g., R0 first), or out of order (e.g., using an offset to R0). The consumer application 332 may consume a record periodically and this period may vary based on application. The consumer application 330 may process the content in numerous ways, depending on application. For example, the content may be merged with other content, stored to one or more databases, shown on a display, or used as a reason to perform an action.

Records 324 may be stored sequentially in the record container 322 based on the order in which the content was produced. For example, R0 contains content relating to a first event. R1 contains content relating to a second event that occurred after the first event, and so on.

Each record 324 may be a discrete data structure (e.g., a byte stream) that stores content. The content may be stored sequentially to each record 324 in the record container 322 by the producer application 302. The source code for serializer 306 and deserializer 336 may be automatically generated by a processing device to a pre-compiled version of the respective applications during development, as described.

In some examples, an application may write to a record container and read to the same or a different record container. Thus, an application may be both a consumer and producer. For example, in some examples, producer application 302 may also be a consumer application. As such, the producer application 302 may have a deserializer that deserializes content byte stream 326 when the producer application 302 reads a record 324 from the record container 322.

In some examples, after content is stored to an event, the content there is immutable. Neither the producer application 302 nor the consumer application 332 may change the content of a record. The producer application may append a record 324 to the record container 322, and the consumer application may read a record 324 from the record container 322. The event streaming platform 320 may clear records after a certain time has passed, or based on other criteria which may be defined by a policy of the event streaming platform. The underlying data structure of a record may be defined by a schema, which may be managed by the event streaming platform 320. The schema may include the schema format (e.g., Avro, Protobuf, JSON Schema) as well as the fields and order of the fields of each record 324. The schema registry may define a scope in which schemas may evolve.

Figure 4:
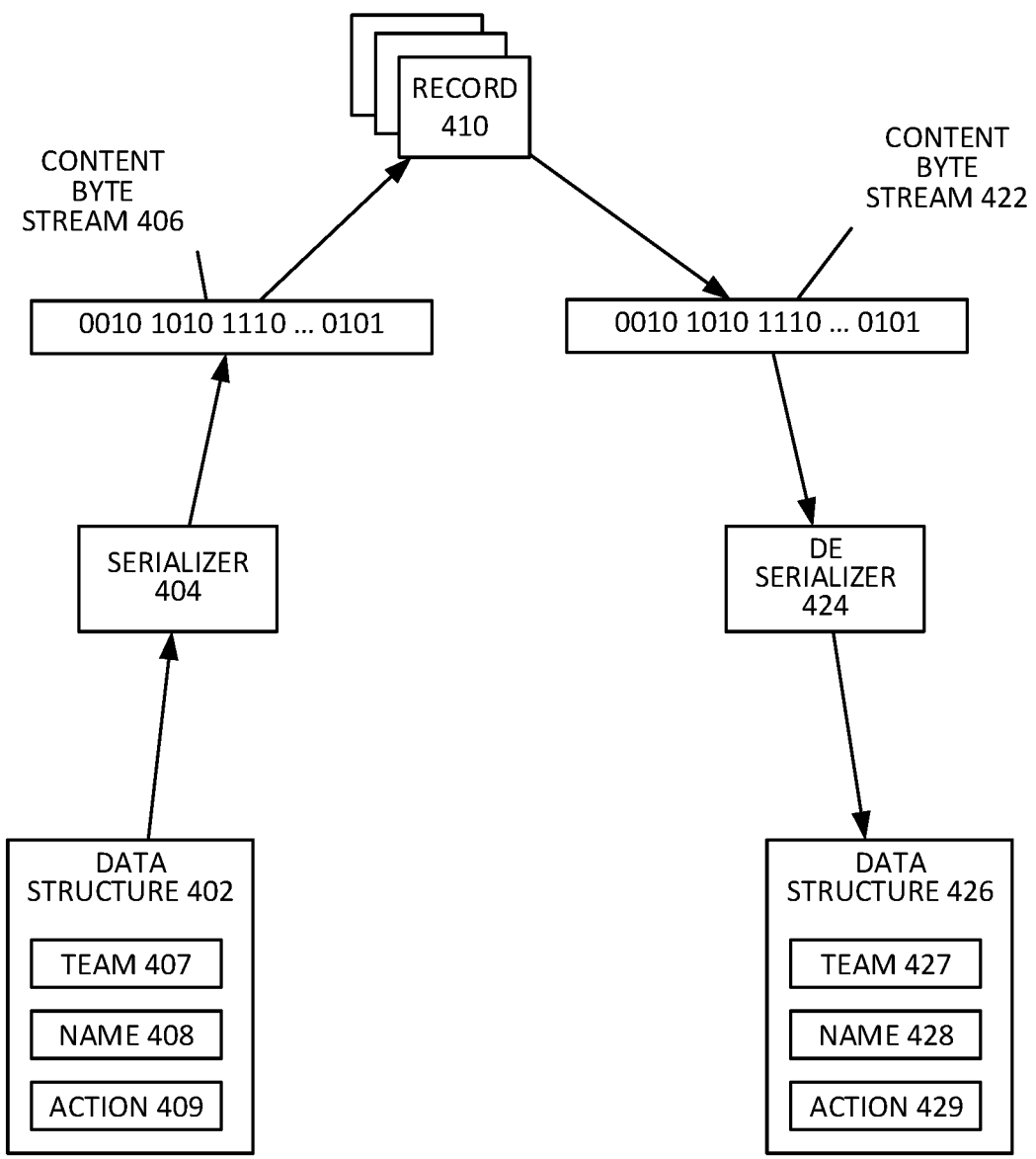
FIG. 4 shows an example workflow using a serializer or deserializer, in accordance with some embodiments.

FIG. 4 shows an example workflow using a serializer or deserializer, in accordance with some embodiments. Processing logic may perform such a workflow during runtime when executing a producer application or a consumer application. Each record 410 may store event-based content fora particular category. For example, the category may be a soccer game. Each time something interesting happens in the soccer game, processing logic stores content to a new record 410 that describes the interesting occurrence.

Processing logic may gather information about an event such as which action occurred (e.g., a score, a foul), which team performed the action, and a name of a player on the team that performed the action. The information may be stored in a data structure 402 which may be a complex type (e.g., a class) or a primitive type. In this example, the data structure may be a complex type with a 'Team' field 407, a 'Name' field 408, and an 'Action' field 409. Each field may also be a complex or primitive type. Data structure 402 (and data structure 426) may have the same underlying data structure as record 410. In other words, record 410 may have the same fields in the same order as data structure 402, but with a raw byte stream format.

Processing logic may detect when an event occurs, and gather information around such an event, by communicating with one or more other applications. Such applications may include a database, a service, a search engine, an electronic subscription, or other application that may contain real-time information. For example, processing logic may electronically monitor a database that contains information about the soccer game, where the information is updated periodically and/or when something interesting happens in the soccer game.

In response to an event, processing logic may populate data structure 402 with the event information and send the content of data structure 402 to be stored as a record 410 on an event streaming platform. Processing logic may use serializer 404 to serialize the data structure 402 into a content byte stream 406. The serializer 404 may be automatically generated pre-compilation of the application, as discussed in other sections. The serializer 404 may form the fields of the data structure into a sequence of bytes shown as content byte stream 406. Processing logic stores the content byte stream 406 as a record 410 on an event streaming platform.

Similarly, processing logic that executes instructions of a consumer application may obtain a record from an event streaming platform (e.g., by polling the event streaming platform). The record is obtained as a content byte stream 422. Processing logic may use deserializer 424 to deserialize the content byte stream and populate data structure 426 with the deserialized content. For example, the consumed record and content byte stream 422 may contain a 'Team' name, a player 'Name', and an 'Action' performed by the player. Deserializer 424 unpacks this content into corresponding fields of data structure 426 such as 'Team' name 427, a player 'Name' 428, and an 'Action' 429 performed by the player.

Figure 5:
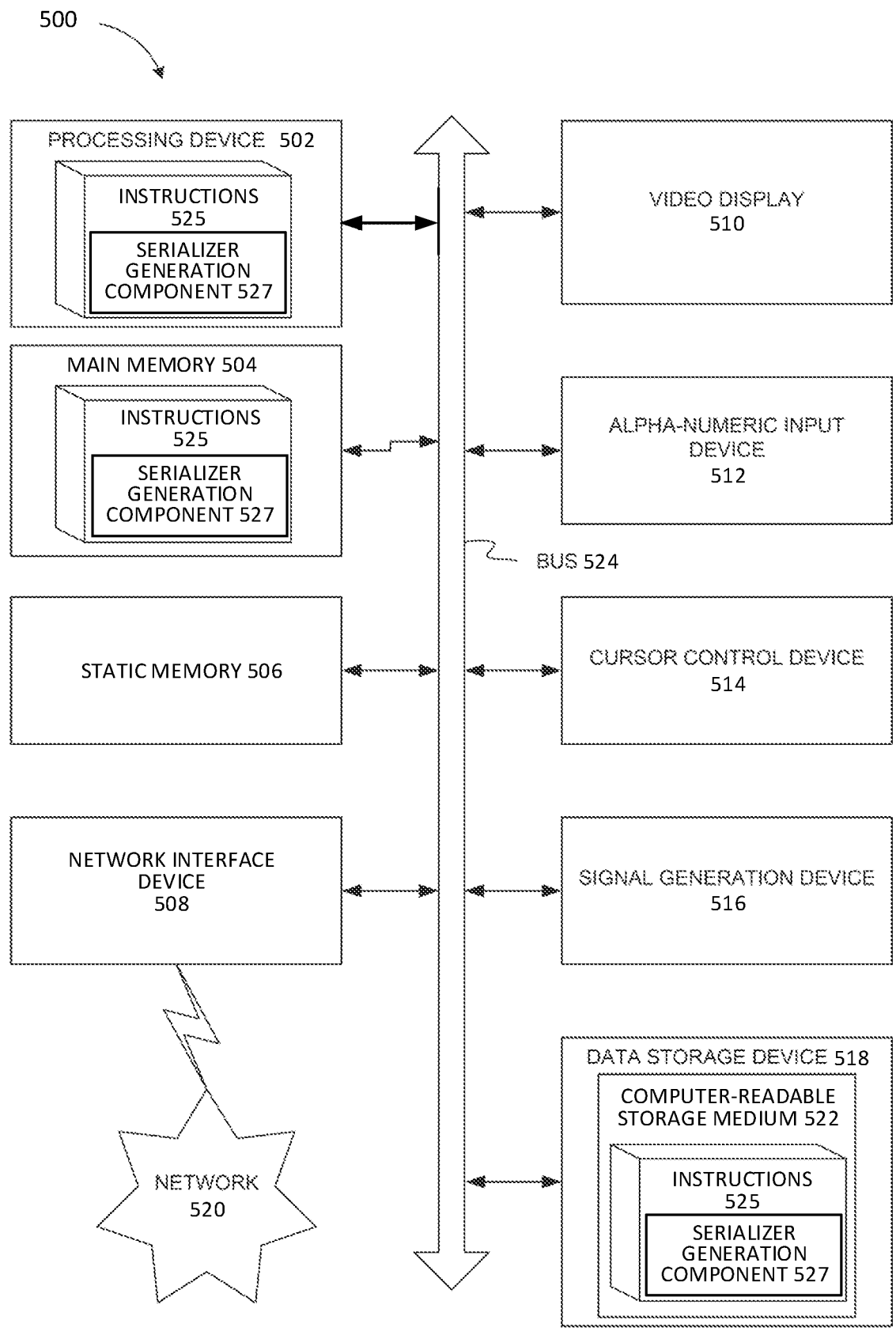
FIG. 5 is a block diagram illustrating a computing device for creating a class automatically, in accordance with some embodiments.

FIG. 5 is a block diagram of an example computing device 500 that may perform one or more of the operations described herein, in accordance with some embodiments. For example, the computing device may be used to develop an application for an event streaming platform, or to host the application that is a producer or consumer to an event streaming platform.

Computing device 500 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 500 may include a processing device (e.g., a general purpose processor, a PLD, etc.) 502, a main memory 504 (e.g., synchronous dynamic random access memory (DRAM), read-only memory (ROM)), a static memory 506 (e.g., flash memory and a data storage device 518), which may communicate with each other via a bus 524.

Processing device 502 may be provided by one or more general-purpose processing devices such as a microprocessor, central processing unit, or the like. In an illustrative example, processing device 502 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 502 may also comprise one or more special-purpose processing devices such as an application specific integrated circuit (ASIC), a field programmable gate array (FPGA), a digital signal processor (DSP), network processor, or the like. The processing device 502 may be configured to execute the operations described herein, in accordance with one or more aspects of the present disclosure, for performing the operations and steps discussed herein.

Computing device 500 may further include a network interface device 608 which may communicate with a network 520. The computing device 500 also may include a video display unit 510 (e.g., a liquid crystal display (LCD) oar cathode ray tube (CRT)), an alphanumeric input device 512 (e.g., a keyboard), a cursor control device 514 (e.g., a mouse) and an acoustic signal generation device 516 (e.g., a speaker). In one embodiment, video display unit 510, alphanumeric input device 512, and cursor control device 514 may be combined into a single component or device (e.g., an LCD touch screen).

Data storage device 518 may include a computer-readable storage medium 628 on which may be stored one or more sets of instructions 525 that may include instructions for a processing device (e.g., processing device 102), for carrying out the operations described herein, in accordance with one or more aspects of the present disclosure. Instructions 525 may also reside, completely or at least partially, within main memory 504 and/or within processing device 502 during execution thereof by computing device 500, main memory 504 and processing device 502 also constituting computer-readable media. The instructions 525 may further be transmitted or received over a network 520 via network interface device 508. The instructions 525 may contain instructions of a serializer generation component 527 that, when executed, perform the operations and steps discussed herein.

While computer-readable storage medium 528 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "sending", "storing", "obtaining", "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure fora variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component may be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" may include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method, comprising:
   determining, by a processing device, whether a pre-compiled version of an application is a producer of a one or more records of an event streaming platform including searching source code of the pre-compiled version of the application for an indication that the application sends content to the event streaming platform;
   in response to determining that the pre-compiled version of the application is the producer of the one or more records of the event streaming platform,
   determining, by the processing device, a data structure to contain the content to be stored to the one or more records of the event streaming platform; and
   generating, by the processing device, a pre-compiled version of a serializer for the application in view of the data structure including generating source code of the pre-compiled version of the serializer that converts each field of the data structure to a byte stream with a sequence as defined by the data structure, wherein, at runtime of the application, the application uses the serializer to serialize the content that is contained in the data structure and stores the serialized content to the one or more records of the event streaming platform.

2. The method of claim 1, wherein the event streaming platform comprises a Kafka Topic that stores the one or more records as serialized.

3. The method of claim 1, wherein determining that the application is a producer of a record comprises: searching, by the processing device, the application for at least one of a class, an interface, a library, or input parameters that are associated with the event streaming platform.

4. The method of claim 1, wherein determining that the application is a producer of a record comprises: searching, by the processing device, the application for a send method that sends the content contained in the data structure to the event streaming platform.

5. The method of claim 1, wherein generating the pre-compiled version of the serializer for the application in view of the data structure comprises: in response to determining that the data structure is a primitive type, importing, by the processing device, an existing primitive type serializer that corresponds to the primitive type of the data structure.

6. The method of claim 1, wherein generating the pre-compiled version of the serializer for the application in view of the data structure comprises: in response to determining that the data structure is a complex type, searching, by the processing device, the application to determine a structure of the complex type, and applying an existing tool or library to the complex type.

7. The method of claim 6, wherein the complex type is a plain old java object (POJO).

8. The method of claim 1, further comprising generating, by the processing device, a deserializer for the application in view of the data structure, wherein the deserializer is used by the application to deserialize the record when the record is retrieved from the event streaming platform at runtime of the application.

9. A system comprising:
a memory; and
a processing device operatively coupled to the memory, the processing device to:
determine, by the processing device, whether a pre-compiled version of an application is a producer of one or more records of an event streaming platform including searching source code of the pre-compiled version of the application for an indication that the application is to send content to the event streaming platform;
in response to determining that the pre-compiled version of the application is the producer of the one or more records of the event streaming platform,
determine, by the processing device, a data structure to contain the content to be stored to the one or more records of the event streaming platform; and
generate, by the processing device, a pre-compiled version of a serializer for the application in view of the data structure including generating, source code of the pre-compiled version of the serializer that converts each field of the data structure to a byte stream with a sequence as defined by the data structure, wherein, at runtime of the application, the application uses the serializer to serialize the content that is contained in the data structure and stores the serialized content to the one or more records of the event streaming platform.

10. The system of claim 9, wherein the event streaming platform comprises a Kafka Topic that stores the one or more records as serialized.

11. The system of claim 9, wherein to determine that the application is a producer of a record, the processing device is to search the application for at least one of a class, a interface, a library, or input parameters that are associated with the event streaming platform.

12. The system of claim 9, wherein to determine that the application is a producer of a record, the processing device is to search the application for a send method that sends the content contained in the data structure to the event streaming platform.

13. The system of claim 9, wherein to generate the pre-compiled version of the serializer for the application in view of the data structure comprises: in response to determining that the data structure is a primitive type, the processing device is to import an existing primitive type serializer that corresponds to the primitive type of the data structure.

14. The system of claim 9, wherein to generate the pre-compiled version of the serializer for the application in view of the data structure comprises: in response to determining that the data structure is a complex type, the processing device is to search the application to determine a structure of the complex type, and apply an existing tool or library to the complex type.

15. The system of claim 14, wherein the complex type is a plain old java object (POJO).

16. The system of claim 9, the processing device is further to generate a deserializer for the application in view of the data structure wherein the deserializer is used by the application to deserialize the record when the one or more records is retrieved from the event streaming platform at runtime of the application.

17. A non-transitory computer-readable storage medium including instructions that, when executed by a processing device, cause the processing device to:
determine, by the processing device, whether a pre-compiled version of an application is a producer of one or more records of an event streaming platform including searching source code of the pre-compiled version of the application for an indication that the application sends content to the event streaming platform;
in response to determining that the pre-compiled version of the application is the producer of the one or more records of the event streaming platform,
determine, by the processing device, a data structure to contain the content to be stored to one or more records of the event streaming platform; and
generate, by the processing device, a pre-compiled version of a serializer for the application in view of the data structure including generating source code of the pre-compiled version of the serializer that converts each field of the data structure to a byte stream with a sequence as defined by the data structure, wherein, at runtime of the application, the application uses the serializer to serialize the content that is contained in the data structure and stores the serialized content to the one or more records of the event streaming platform.

18. The non-transitory computer-readable storage medium of claim 17, wherein the event streaming platform comprises a Kafka Topic that stores the one or more records as serialized.

19. The non-transitory computer-readable storage medium of claim 17, wherein to determine that the application is a producer of a record, the processing device is to search the application for at least one of a class, an interface, a library, or input parameters that are associated with the event streaming platform.

20. The non-transitory computer-readable storage medium of claim 17, wherein to determine that the application is a producer of a record, the processing device is to search the application for a send method that sends the content contained in the data structure to the event streaming platform.

* * * * *